(12) United States Patent
Niizato et al.

(10) Patent No.: US 7,496,047 B2
(45) Date of Patent: Feb. 24, 2009

(54) COMMUNICATION TERMINAL, OPERATING EQUIPMENT, COMMUNICATION SYSTEM, AND COMMUNICATION CONTROL METHOD

(75) Inventors: Noriko Niizato, Kawachinagano (JP); Hiromi Himeno, Yokosuka (JP); Kazufumi Yunoki, Yokosuka (JP); Hiroyuki Hattori, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1008 days.

(21) Appl. No.: 10/387,578

(22) Filed: Mar. 14, 2003

(65) Prior Publication Data
US 2003/0218975 A1 Nov. 27, 2003

(30) Foreign Application Priority Data
Mar. 15, 2002 (JP) .......................... P2002-073009

(51) Int. Cl.
*H04L 12/26* (2006.01)
*H04L 12/28* (2006.01)
*H04M 11/00* (2006.01)
*H04L 12/56* (2006.01)

(52) U.S. Cl. ....................... 370/252; 370/282; 370/419; 379/100.16

(58) Field of Classification Search ........................ None
See application file for complete search history.

(56) References Cited

U.S. PATENT DOCUMENTS

| | | | | |
|---|---|---|---|---|
| 5,050,005 A | * | 9/1991 | Kagami | ....................... 358/434 |
| 5,189,525 A | * | 2/1993 | Kotani | ....................... 358/407 |
| 5,943,138 A | * | 8/1999 | Fujiki | ....................... 358/407 |
| 6,782,095 B1 | * | 8/2004 | Leong et al. | ................ 379/386 |
| 7,006,471 B1 | * | 2/2006 | Iverson et al. | ................ 370/331 |
| 7,069,291 B2 | * | 6/2006 | Graves et al. | ................ 709/201 |
| 7,072,360 B2 | * | 7/2006 | Dravida et al. | ............... 370/468 |
| 7,289,511 B2 | * | 10/2007 | Christie et al. | ............ 370/395.1 |
| 7,343,153 B1 | * | 3/2008 | Kauhanen et al. | ............ 455/416 |
| 2003/0139171 A1 | * | 7/2003 | Kuita | .......................... 455/411 |

FOREIGN PATENT DOCUMENTS

| | | |
|---|---|---|
| GB | 2 353 445 A | 2/2001 |
| WO | WO 97/21319 | 6/1997 |
| WO | WO 00/78086 A1 | 12/2000 |
| WO | WO 01/80585 A1 | 10/2001 |

* cited by examiner

*Primary Examiner*—Gregory B Sefcheck
(74) *Attorney, Agent, or Firm*—Oblon, Spivak, McClelland, Maier & Neustadt, P.C.

(57) ABSTRACT

The object is to provide a communication terminal which can improve the flexibility in selecting operating equipments when an operating equipment for operating information to be transmitted/received to/from a network is decided. The communication terminal control section 102 of the communication terminal 10 outputs incoming bearer information for specifying a bearer of the incoming call included in the setup message to each operating equipment, decides a bearer for communicating based on the first call confirm request message, second call confirm request message, and incoming call reject request message, which are output by each operating equipment according to the above output, outputs the decided bearer information for specifying the decided bearer to the operating equipment which output the first call confirm request message or second call confirm request message, decides the operating equipment which corresponds to selection signal from external device out of the operating equipments which output the response enable information according to the above output as the section for operating the information, and releases the sections other than this decided section.

6 Claims, 4 Drawing Sheets

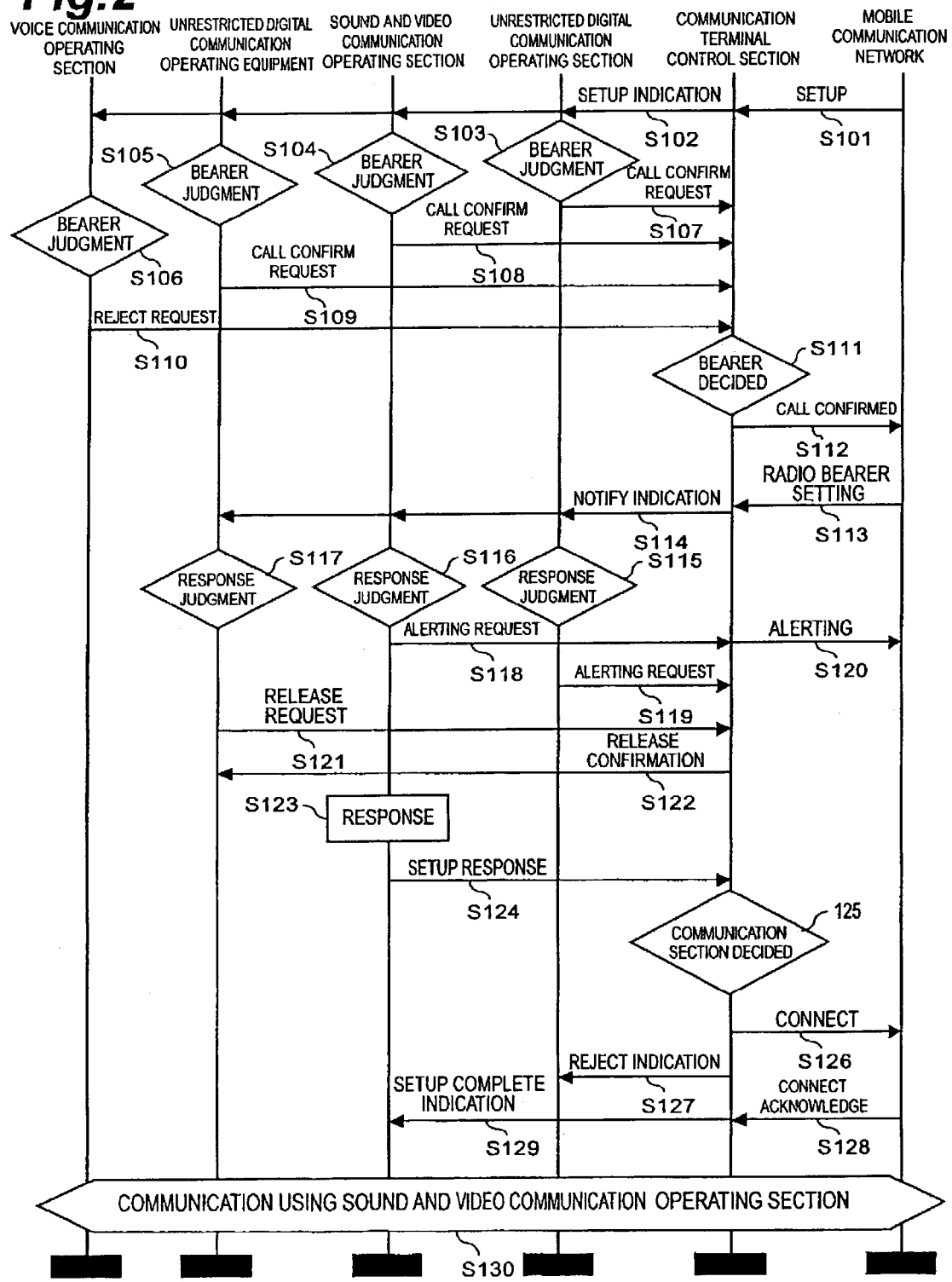

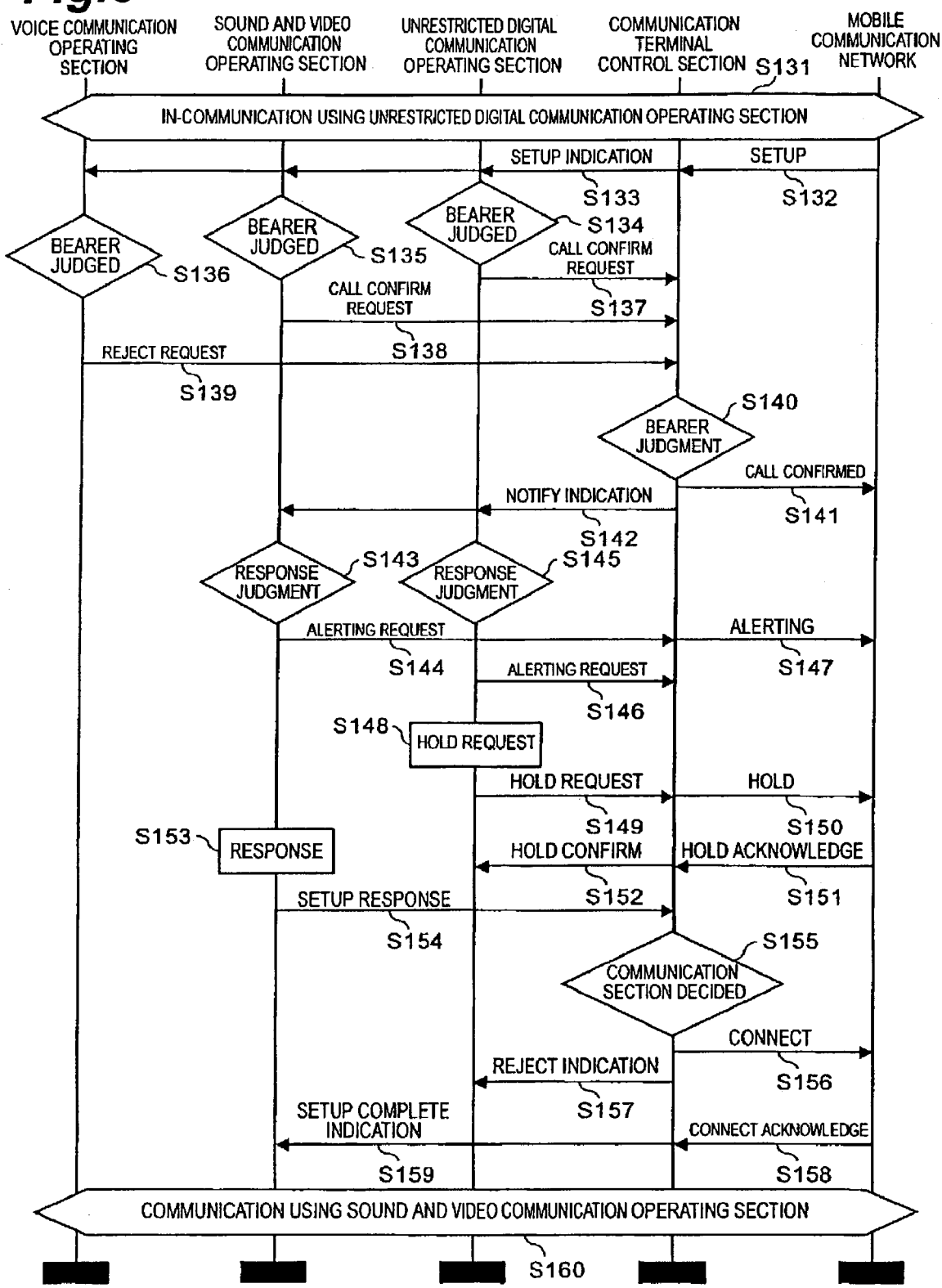

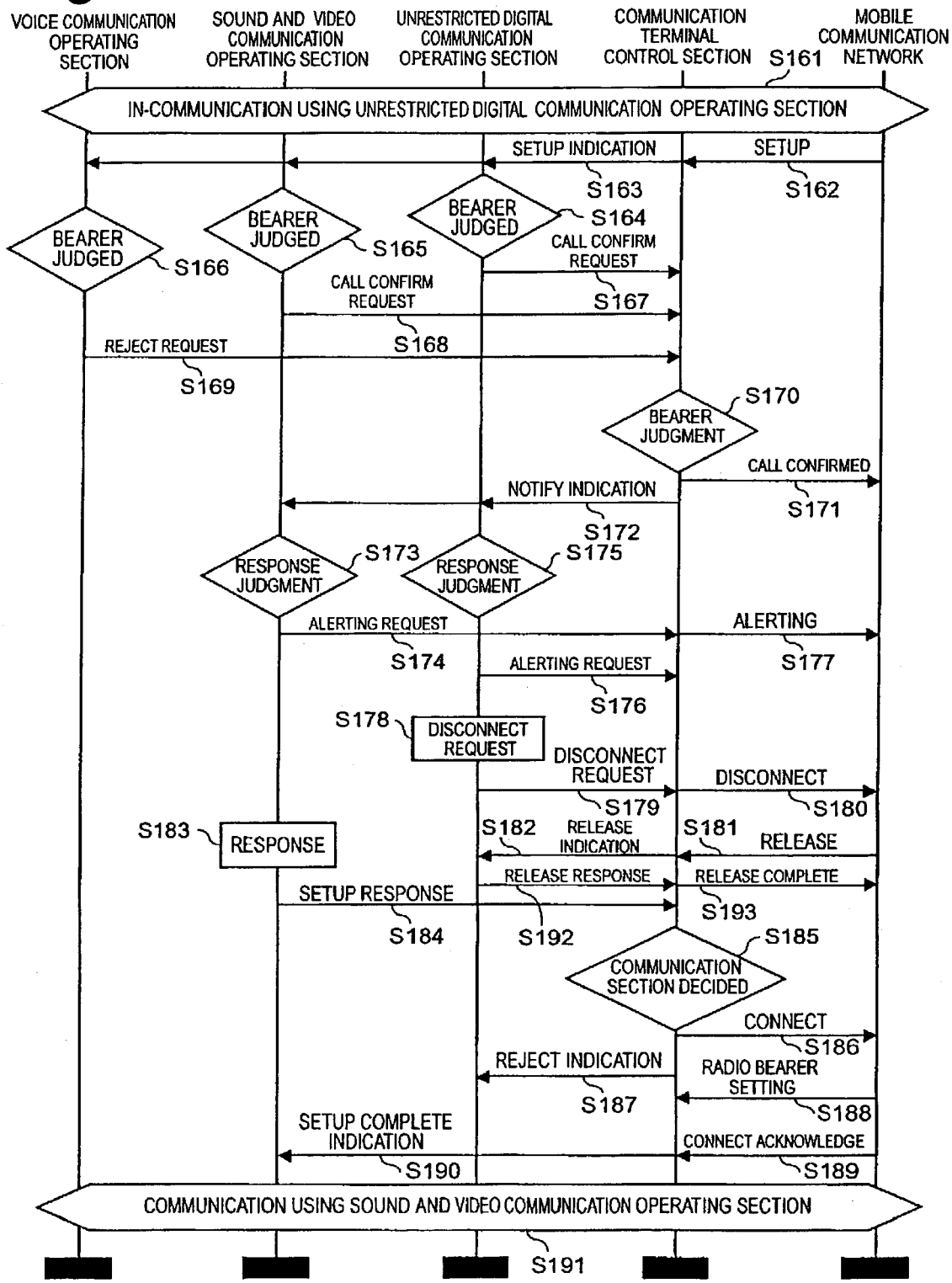

COMMUNICATION TERMINAL, OPERATING EQUIPMENT, COMMUNICATION SYSTEM, AND COMMUNICATION CONTROL METHOD

BACKGROUND OF THE INVENTION

1. Field of the Invention

The present invention relates to a communication system for transmitting/receiving information to/from a network, a communication terminal and an operating equipment included in the communication system, and communication control method thereof.

2. Related Background Art

A mobile station, such as a cellular-phone, as an example of a communication terminal which transmits/receives information to/from a network, comprises operating equipments which can operate information to be transmitted/received to/from the base station of the network, and operating equipments which are connected to outside the mobile station and can operate information to be transmitted/received to/from the base station, wherein communication terminal control means for deciding an operating equipment which operates information to be transmitted/received to/from the base station out of these operating equipments is further comprised.

A mode for the communication terminal control means to decide the operating equipment is deciding an operating equipment which matches the bearer of an incoming call, which is specified by the incoming bearer information included in the setup message transmitted from the base station, as an operating equipment for operating information to be transmitted/received to/from the base station based on the predetermined priority and arrangement, and releasing the operating equipments other than the decided operating equipment so that these operating equipments cannot operate information.

In other words, when the incoming bearer is a "unrestricted digital communication", and when a bearer whereby communication is actually performed is also decided as "unrestricted digital communication", operating equipments other than the operating equipment which outputs a first call confirm request messages for accepting an incoming call with the bearer of "unrestricted digital communication", such as an operating equipment which outputs a second call confirm request messages for accepting the incoming call with a bearer of "sound and video communication", are released. In the present description, a bearer is specified by the combination of the information transfer capability (ITC), communication quality, coding system, communication speed, and other factors. Therefore even if the bearer service type is "unrestricted digital communication", the bearer may be handled as a different bearer, such as "unrestricted digital communication 1" or "unrestricted digital communication 2", depending on the difference of the communication quality thereof. Therefore the case when a bearer is different in the present description includes the case when the bearers are different, such as "unrestricted digital communication" and "sound and video communication", and the case when the bearers are different depending on the difference in communication quality, such as "unrestricted digital communication 1" and "unrestricted digital communication 2".

When the communication terminal control means of the mobile station decides a bearer whereby communication is actually performed, the incoming bearer and the bearer whereby communication is actually performed, may differ. In the case of the above example, even if the incoming bearer is "unrestricted digital communication", the "sound and video communication" bearer may be decided due to certain factors. In such a case, for a conventional mobile station, operating equipments other than an operating equipment which outputs the second call confirm request messages for accepting an incoming call with a bearer of "sound and video communication", are released, so an operating equipment which can support a bearer of "sound and video communication" may not be decided as an operating equipment which operates information, and in such a case, the choices on deciding an operating equipment which operates information are narrowed.

With the foregoing in view, it is an object of the present invention to provide a communication terminal, operating equipment, communication system, and communication control method which can increase the flexibility in selecting operating equipments when an operating equipment for operating information to be transmitted/received to/from a network is decided.

SUMMARY OF THE INVENTION

The communication terminal of the present invention is a communication terminal comprising data transmission/reception means for transmitting/receiving information to/from a network, and communication terminal control means for deciding an operating equipment for operating the information to be transmitted/received to/from the network out of a plurality of operating equipments which can operate information to be transmitted/received via the data transmission/reception means, wherein the communication terminal control means outputs incoming bearer information for specifying a bearer of the incoming call included in the setup message which the data transmission/reception means receives from the network, to each one of the plurality of operating equipments, decides a bearer for communicating with the network based on a first call confirm request messages for accepting an incoming call with the incoming bearer, a second call confirm request messages for accepting an incoming call with a bearer other than the incoming bearer, or incoming call reject request message for rejecting the incoming call, which are output by the plurality of operating equipments according to the incoming bearer information which was output, outputs the decided bearer information for specifying the decided bearer, to the operating equipment which has output the first call confirm request messages or the second call confirm request messages, and decides an operating equipment which corresponds to a selection signal from external device, as an operating equipment for operating information to be transmitted/received to/from the network, out of the operating equipments which have output response enable information for notifying that the response to the decided bearer is enabled, and releases the operating equipments other than the decided operating equipment, according to the output of the decided bearer information.

According to the communication terminal of the present invention, the communication terminal control means outputs the decided bearer information to the operating equipment which has output the first call confirm request messages or the second call confirm request messages, so even the operating equipment which has output a second call confirm request messages which is different from the decided bearer according to the output of the incoming bearer information, for example, has the possibility to be decided as a part for operating information, and flexibility in selecting operating equipments is improved.

The operating equipment of the present invention is an operating equipment, comprising an operation control means that transmits/receives information to/from a network via communication terminal control means included in a communication terminal for transmitting/receiving information and operates the information, wherein the operation control means outputs one of a first call confirm request messages for accepting an incoming call with the incoming bearer, a second call confirm request messages for accepting incoming call with a bearer other than the incoming bearer, and an incoming call reject request message for rejecting the incoming call, to the communication terminal control means, according to incoming bearer information for specifying a bearer of the incoming call included in the setup message received from the network, which is output from the communication terminal control means; and the operation control means outputs response enable information for notifying that response to the decided bearer is enabled, or release request message for requesting release, to the communication terminal control means, according to decided bearer information for specifying a decided bearer for communicating with the network, which is output from the communication terminal control means depending on the output.

According to the operating equipment of the present invention, the operation control means outputs one of the first call confirm request messages, the second call confirm request messages, and the incoming call reject request message, according to the incoming bearer information which the communication terminal control means outputs. For example, to transfer the information for accepting the incoming call with another bearer to the communication terminal control means, the operation control means outputs the second call confirm request messages to the communication terminal control means. When the operation control means outputs the first call confirm request messages or the second call confirm request messages, the communication terminal control means outputs the decided bearer information, so whether the response to the decided bearer is enabled can be judged based on the decided bearer information.

The communication system of the present invention is a communication system comprising a communication terminal further comprising data transmission/reception means for transmitting/receiving information to/from a network and communication terminal control means for deciding an operating equipment for operating the information to be transmitted/received to/from the network out of a plurality of operating equipments which can operate information to be transmitted/received via the data transmission/reception means, and the plurality of operating equipments, wherein the communication terminal control means outputs incoming bearer information for specifying a bearer of the incoming call included in the setup message which the data transmission/reception means receives from the network, to each one of the plurality of operating equipments, each one of the plurality of operating equipments outputs one of a first call confirm request messages for accepting the incoming call with the incoming bearer, a second call confirm request messages for accepting the incoming call with a bearer other than the incoming bearer, and an incoming call reject request message for rejecting the incoming call to the communication terminal control means, the communication terminal control means decides a bearer for communicating with the network according to the output, and also outputs the decided bearer information for specifying the decided bearer, to the operating equipment which has output the first call confirm request messages or the second call confirm request messages, the operating equipment outputs response enable information, for notifying that response to the decided bearer is enabled to the communication terminal control means according to the output, and the communication terminal control means decides an operating equipment which corresponds to a selection signal from external device, out of the operating equipments which have output the response enable information, as the operating equipment which operates information to be transmitted/received to/from the network according to the output, and releases the operating equipments other than the decided operating equipment.

According to the communication system of the present invention, the communication terminal control means outputs the decided bearer information to the operating equipment which has output the first call confirm request messages or the second call confirm request messages, so even the operating equipment which has output the second call confirm request messages according to the output of the incoming bearer information, for example, has the possibility to be decided as a part for operating information, and flexibility in selecting operating equipments is improved. Also one of the first call confirm request messages, second call confirm request messages, and incoming call reject request message is output according to the incoming bearer information which the communication terminal control means output, so when the second call confirm request messages is output, for example, information for accepting the incoming call with another bearer can be transferred to the communication terminal control means. When the first call confirm request messages or second call confirm request messages is output, the communication terminal control means outputs the decided bearer information, so whether a response to the decided bearer is enabled can be judged based on the decided bearer information.

The communication terminal of the present invention is a communication terminal comprising data transmission/reception means for transmitting/receiving information to/from a network and communication terminal control means for deciding an operating equipment for operating the information to be transmitted/received to/from the network out of a plurality of operating equipments which can operate information to be transmitted/received via the data transmission/reception means, wherein when a setup message is further received during communication with the network, the communication terminal control means outputs incoming bearer information for specifying a bearer of the incoming call included in the setup message, to each one of the plurality of operating equipments, decides a bearer for communicating with the network based on a first call confirm request messages for accepting an incoming call with the incoming bearer, a second call confirm request messages for accepting an incoming call with a bearer other than the incoming bearer, or incoming call reject request message for rejecting the incoming call, which are output by the plurality of operating equipments according to the incoming bearer information which was output, outputs the decided bearer information for specifying the decided bearer to the operating equipment which has output the first call confirm request messages or the second call confirm request messages, and performs processing so that the operating equipment which is in the course of communication and is specified by the hold/disconnect request message, which is input from external device, becomes hold status or disconnect status, decides an operating equipment which corresponds to a selection signal from external device, out of the operating equipments which have output response enable information for notifying that response to the decided bearer is enabled, as the operating equipment for operating information to be transmitted/received to/from the network, and releases the operating equipments other than the decided operating equipment.

According to the communication terminal of the present invention, the communication terminal control means outputs the decided bearer information to the operating equipment which has output the first call confirm request messages or second call confirm request messages, so the information for judging whether the operating equipment will continue the incoming call processing can be provided, each operating equipment can have the possibility to be decided as a part for operating information regardless the communication status thereof, and the flexibility in selecting operating equipments is improved. The communication terminal control means sets an operating equipment during communication, which corresponds to a selection signal from external device, to hold status or disconnect status, so the case of responding with an operating equipment other than the operating equipment currently communicating, can be supported.

The communication control method of the present invention is a communication control method, comprising: an incoming bearer output step for communication terminal control means of a communication terminal, which transmits/receives information to/from a network, to output incoming bearer information for specifying a bearer of the incoming call included in the setup message which the data transmission/reception means of the communication terminal receives from the network, to each one of a plurality of operating equipments which can operate information to be transmitted/received via the data transmission/reception means; a bearer decision step for the communication terminal control means to decide a bearer for communicating with the network based on a first call confirm request messages for accepting an incoming call with the incoming bearer, a second call confirm request messages for accepting an incoming call with a bearer other than the incoming bearer, or an incoming call reject request message for rejecting the incoming call, which are output by the plurality of operating equipments according to the output of the incoming bearer information; a bearer output step for the communication terminal control means to output the decided bearer information for specifying the decided bearer to the operating equipment which has output the first call confirm request messages or second call confirm request messages; a decision step for the communication terminal control means to decide an operating equipment which corresponds to a selection signal from external device, out of the operating equipments which have output response enable information for notifying that response to the decided bearer is enabled, as the operating equipment for operating information to be transmitted/received to/from the network according to the output of the decided bearer information; and a release step for the communication terminal control means to release the operating equipments other than the operating equipment decided in the decision step out of the operating equipments which have output the response enable information for notifying that response to the decided bearer is enabled.

According to the communication control method of the present invention, the communication terminal control means outputs the decided bearer information to the operating equipment which has output the first call confirm request messages or second call confirm request messages, so even the operating equipment which has output the second call confirm request messages according to the output of the incoming bearer information, for example, has the possibility to be decided as a part for operating information, and the flexibility in selecting operating equipments is improved.

The communication control method of the present invention is a communication control method, comprising: an incoming bearer acceptance step for an operating equipment, which can transmit/receive information to/from a network via communication terminal control means included in a communication terminal to transmit/receive the information, and can operate information, to receive incoming bearer information from the communication terminal control means for specifying the incoming bearer included in the setup message received from the network; a call acceptance step for the operating equipment to output one of a first call confirm request messages for accepting an incoming call with the incoming bearer, a second call confirm request messages for accepting an incoming call with a bearer other than the incoming bearer, and an incoming call reject request message for rejecting the incoming call, to the communication terminal control means according to the received incoming bearer; and a response step for the operating equipment to output response enable information for notifying that response to the decided bearer is enabled, or release request message for requesting release, to the communication terminal control means according to the decided bearer information for specifying the decided bearer for communicating with the network, which is output from the communication terminal control means according to the output.

According to the communication method of the present invention, one of the first call confirm request messages, second call confirm request messages, and incoming call reject request message is output according to the incoming bearer information which the communication terminal control means outputs. For example, to transfer the information for accepting the incoming call with another bearer to the communication terminal control means, the second call confirm request messages is output to the communication terminal control means. When the first call confirm request messages or second call confirm request messages is output, the communication terminal control means outputs the decided bearer information, so whether response to the decided bearer is enabled can be judged based on the decided bearer information.

The communication control method of the present invention is a communication control method, comprising: an incoming bearer output step for communication terminal control means of a communication terminal which transmits/receives information to/from a network to output incoming bearer information for specifying a bearer of the incoming call included in the setup message which the data transmission/reception means of the communication terminal receives from the network, to each one of a plurality of operating equipments which can operate information to be transmitted/received via the data transmission/reception means; call acceptance step for the operating equipment to output one of a first call confirm request messages for accepting an incoming call with the incoming call bearer, a second call confirm request messages for accepting an incoming call with a bearer other than the incoming bearer, and a call reject request message for rejecting the incoming call, to the communication terminal control means according to the received incoming bearer; a bearer decision step for the communication terminal control means to decide a bearer for communicating with the network according to the output; a bearer output step for communication terminal control means to output the decided bearer information for specifying the decided bearer to the operating equipment which has output the first call confirm request messages or the second call confirm request messages; a response step for the operating equipment to output response enable information for notifying that response to the decided bearer is enabled, to the communication terminal control means according to the output; a decision step for the communication terminal control means decides an operating equipment which corresponds to a selection signal from external device, out of the operating equipments which have output the response enable information, as the operating equipment for operating information to be transmitted/received to/from the network according to the output; and a release step for the communication terminal control means to release the operating equipments other than the operating equipment decided in the decision step out of the operating equipments which have output the response enable information.

According to the communication control method of the present invention, the communication terminal control means outputs the decided bearer information to the operating equipment which has output the first call confirm request messages or second call confirm request messages, so even the operating equipment which has output the second call confirm request messages according to the output of the incoming bearer information, for example, has the possibility to be decided as a part for operating information, and flexibility in selecting operating equipments is improved. Also, one of the first call confirm request messages, second call confirm request messages, and incoming call reject request message is output according to the incoming bearer information which the communication terminal control means outputs, so when the second call confirm request messages is output, for example, information notifying that the incoming call is accepted with another bearer can be transferred to the communication terminal control means. When the first call confirm request messages or second call confirm request messages is output, the communication terminal control means outputs the decided bearer information, so whether response to the decided bearer is enabled can be judged based on the decided bearer information.

The communication control method of the present invention is a communication control method comprising: an incoming bearer output step for communication terminal control means of a communication terminal which transmits/receives information to/from a network to output incoming bearer information for specifying a bearer of the incoming call included in a setup message when the setup message is further received during communication with the network, to each one of a plurality of operating equipments which can operate information to be transmitted/received via the data transmission/reception means of the communication terminal; a bearer decision step for the communication terminal control means to decide a bearer for communicating with the network based on a first call confirm request messages for accepting an incoming call with the incoming bearer, a second call confirm request messages for accepting an incoming call with a bearer other than the incoming bearer, or an incoming call reject request message for rejecting the incoming call, which are output by the plurality of operating equipments according to the output of the incoming bearer information; a bearer output step for the communication terminal control means to output the decided bearer information for specifying the decided bearer to the operating equipment which has output the first call confirm request messages or second call confirm request messages; a hold/disconnect step for the communication terminal control means to perform processing so that the operating equipment, which is in the course of communication and is specified by the hold/disconnect request message, which is input from external device, that is an operating equipment in the course of communication, becomes hold status or disconnect status, according to the output of the decided bearer information; a decision step for the communication terminal control means to decide an operating equipment which corresponds to a selection signal from external device, out of the operating equipments which have output the response enable information for notifying that response to the decided bearer is enabled, as the operating equipment for operating information to be transmitted/received to/from the network according to the output of the decided bearer information; and a release step for the communication terminal control means to release operating equipments other than the decided operating equipment out of the operating equipments which have output the response enable information for notifying that response to the decided bearer is enabled.

According to the communication method of the present invention, the communication terminal control means outputs the decided bearer information to the operating equipment which has output the first call confirm request messages or second call confirm request messages, so information for judging whether the operating equipment will continue incoming call processing can be provided, and each operating equipment has the possibility to be decided as a part for operating information, regardless the respective communication status, which improves the flexibility in selecting operating equipments. The communication terminal control means sets the selected operating equipment during communication, which corresponds to a selection signal from external device, to hold status or disconnect status, so the case of responding with an operating equipment other than the operating equipment currently in the course of communication, for example, can be supported.

BRIEF DESCRIPTION OF THE DRAWINGS

FIG. 2 is a sequence chart depicting the processing of a communication terminal when responding;

FIG. 3 is a sequence chart depicting the processing of a communication terminal when responding; and FIG. 4 is a sequence chart depicting the processing of a communication terminal when responding.

DESCRIPTION OF THE PREFERRED EMBODIMENTS

Figure 1:
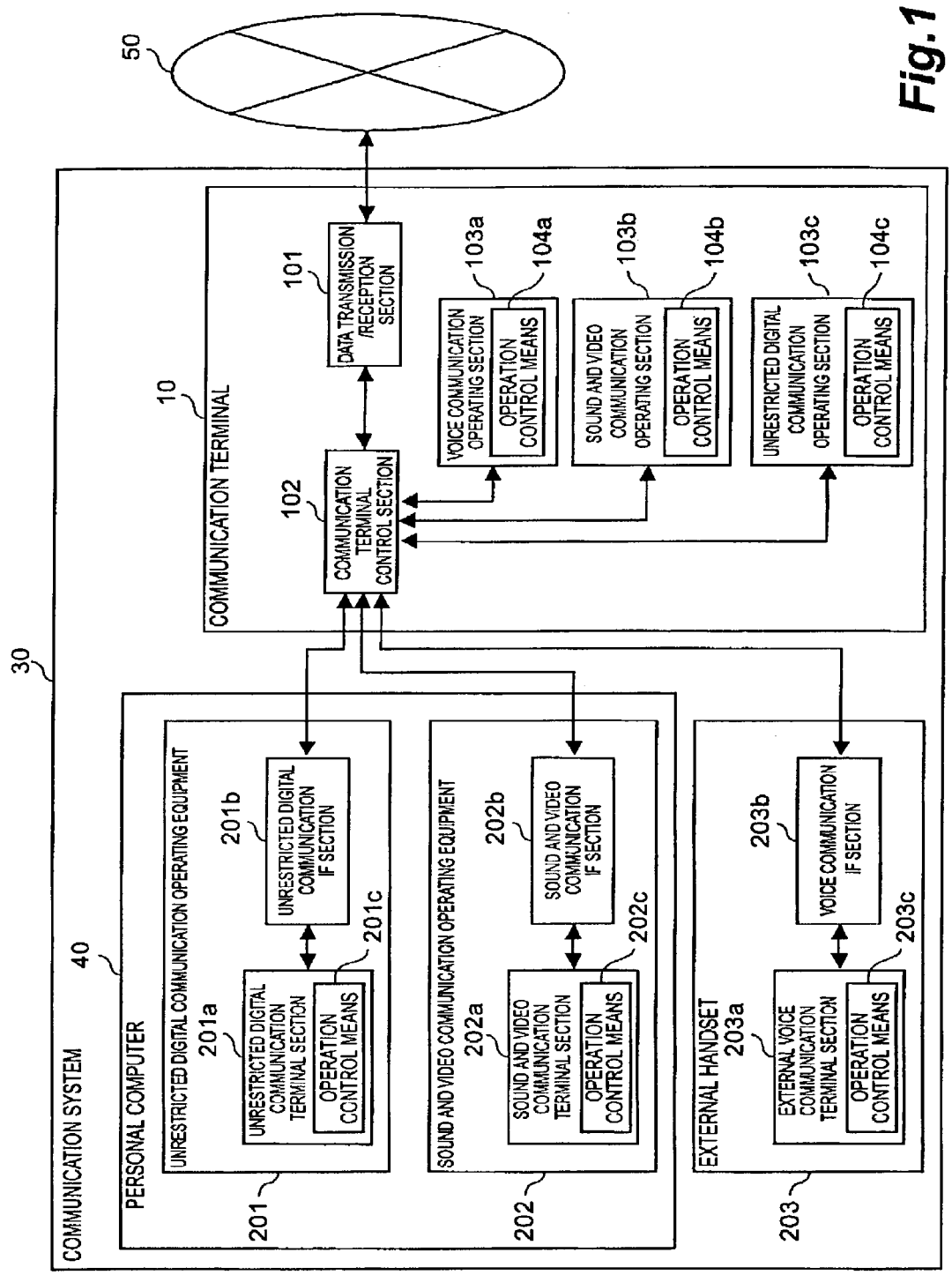
FIG. 1 is a diagram depicting a communication terminal of an embodiment of the present invention.

The findings of the present invention will be easily understood by following the detailed descriptions with reference to the accompanying drawings shown only as examples. Now the embodiments of the present invention will be described with reference to the accompanying drawings. When possible, the same composing elements are denoted by the same reference numerals, where redundant descriptions are omitted.

A communication terminal 10 which is an embodiment of the present invention will be described with reference to FIG. 1. FIG. 1 is a diagram depicting a configuration of a communication system 30, which is comprised of the communication terminal 10, a personal computer 40, and an external handset (operating equipment) 203. The communication terminal 10 is configured so that data communication is possible with information equipment, such as another communication terminal and personal computer, which are not illustrated, via a mobile communication network 50. The mobile communication network (network) 50 is comprised of a base station, and such equipment as a base station control device and switchboard, which are not illustrated, and the communication terminal 10 is connected with the mobile communication network 50 via the base station (not illustrated).

The personal computer 40 is connected so that data can be exchanged with the communication terminal 10, and is configured such that the communication terminal 10 can operate information to be transmitted/received in the data communication which the communication terminal 10 performs via the mobile communication network 50. In the case of the present embodiment, the personal computer 40 is configured, including the unrestricted digital communication operating equipment (operating equipment) 201 and the sound and video communication operating equipment (operating equipment) 202.

The unrestricted digital communication operating equipment 201 is comprised of a unrestricted digital communication terminal section 201a and unrestricted digital communication interface section 201b, and the unrestricted digital communication terminal section 201a is comprised of an operation control means 201c which has control functions in the unrestricted digital communication terminal section 201a. The unrestricted digital communication terminal section 201a is a section which can handle unrestricted digital communication information, and handles information where the type of the bearer is unrestricted digital communication, out of the information which the communication terminal 10 transmits/receives. When the unrestricted digital communication terminal section 201a receives the bearer information for specifying a bearer from the communication terminal 10, the unrestricted digital communication terminal section 201a outputs a call confirm request message for accepting the incoming call with the bearer (first call confirm request messages) if the bearer specified by the bearer information is unrestricted digital communication, and outputs a call confirm request message for accepting the incoming call with a unrestricted digital communication (second call confirm request messages), or an incoming call reject request message for rejecting the incoming call if the bearer specified by the bearer information is a bearer other than unrestricted digital communication. The unrestricted digital communication interface section 210b is a section which is connected to the communication terminal 10 and transmits/receives unrestricted digital communication information.

The sound and video communication operating equipment 202 is comprised of a sound and video communication terminal section 202a and a sound and video communication interface section 202b, and the sound and video communication terminal section 202a is comprised of an operation control means 202c which has control functions in the sound and video communication terminal section 202a. The sound and video communication terminal section 202a is a section which can handle sound and video communication information, and handles information where the type of the bearer is sound and video communication, such as sound and video communication information, out of the information transmitted/received by the communication terminal 10. When the sound and video communication terminal section 202a receives the bearer information for specifying a bearer from the communication terminal 10, the sound and video communication terminal section 202a outputs the call setting reception information for accepting the incoming call with the bearer (first call confirm request messages) if the bearer specified by the bearer information is sound and video communication, and outputs a call confirm request message for accepting the incoming call with a bearer of sound and video communication (second call confirm request messages) or an incoming call reject request message for rejecting the incoming call if the bearer specified by the bearer information is a bearer other than sound and video communication. The sound and video communication interface section 202b is a section which is connected to the communication terminal 10, and transmits/receives sound and video communication information.

The external handset 203 is comprised of an external voice communication terminal section 203a and a voice communication interface section 203b, and the external voice communication terminal section 203a is comprised of an operation control means 203c which has control functions in the external voice communication terminal section 203a. The external voice communication terminal section 203a is a section which can handle voice communication information, and handles information where the type of the bearer is voice communication out of information transmitted/received by the communication terminal 10. When the external voice communication terminal section 203a receives the bearer information for specifying the bearer from the communication terminal 10, the external voice communication terminal section 203a outputs a call confirm request message for accepting the incoming call with the bearer (first call confirm request messages) if the bearer specified by the bearer information is voice communication, and outputs a call confirm request message for accepting the incoming call with a bearer of voice communication (second cell acceptance information) or an incoming call reject request message for rejecting the incoming call if the bearer specified by the bearer information is a bearer other than voice communication. The voice communication interface section 203b is a section which is connected to the communication terminal 10, and transmits/receives voice communication information. The equipment to be connected to the communication terminal 10 is not limited to these. The personal computer 40 may include only one of the unrestricted digital communication operating equipment 201 or sound image operating equipment 202, and either one of the personal computer 40 or the external handset 203 may be used. No equipment may be connected to the communication terminal 10.

The communication terminal 10 is a communication terminal which also has data communication functions. Instead of the communication terminal, a portable information terminal having communication functions, such as a PDA (Personal Digital Assistants) maybe used, where information communicable equipment can be widely applied. The communication terminal 10 is physically comprised of a CPU (Central Processing Unit), memory, such input devices as input keys and microphone, such output devices as a display and speaker, such storage devices as a hard disk, amplification device, signal conversion device, and a mobile station including an antenna.

The communication terminal 10 includes a data transmission/reception section (data transmission/reception means) 101, communication terminal control section (communication terminal control means) 102, voice communication operating section (operating equipment) 103a, sound and video communication operating section (operating equipment) 103b, and unrestricted digital communication operating section (operating equipment) 103c, as the functional composing elements. Each composing element will now be described in detail.

The data transmission/reception section 101 is a section which transmits/receives information to/from a base station (not illustrated) constituting the mobile communication network 50. More specifically, when a call comes in, the data transmission/reception means 101 receives the setup message from the base station and outputs the setup message to the communication terminal control section 102. This setup message includes incoming bearer information for specifying the incoming bearer which is transmitted from the base station (not illustrated). The data transmission/reception section 101 transmits the call confirm request message, which is output from the communication terminal control section 102, and response information to the base station (not illustrated), and also outputs the radio bearer setting information and response confirmation information which are received from the base station (not illustrated) to the communication terminal control section 102.

The communication terminal control section 102 is a section for deciding a section or an operating equipment which operates information to be transmitted/received to/from the base station (not illustrated) out of the voice communication operating section (operating equipment) 103a, sound and video communication operating section (operating equipment) 103b, unrestricted digital communication operating section (operating equipment) 103c, personal computer 40, and external handset 203. More specifically, the communication terminal control section 102 outputs incoming bearer information, which is included in the setup message received by the data transmission/reception section 101 from the base station (not illustrated), and is used for specifying the bearer of the incoming call, to the voice communication operating section (operating equipment) 103a, sound and video communication operating section (operating equipment) 103b, unrestricted digital communication operating section (operating equipment) 103c, personal computer 40, and external handset 203. The communication terminal control section 102 decides a bearer for communicating with the mobile communication network 50 based on the call confirm request message for accepting the incoming call with the incoming bearer (first call confirm request messages), the call confirm request message for accepting the incoming call with a bearer other than the incoming bearer (second call confirm request messages), or the incoming call reject request message for rejecting the incoming call, which are output according to the above output incoming bearer information. The communication terminal control section 102 also outputs the notify indication message which includes the decided bearer information for specifying this decided bearer to the section which output the call confirm request message, and according to the output of the notify indication message which includes the decided bearer information, the communication terminal control section 102 decides the section which corresponds to selection signal from external device (for example, the section selected by the user) out of the sections which output the alerting request messages as a response enable information for notifying that response to the decided bearer is enabled, as the section for operating information to be transmitted/received to/from the mobile communication network 50, and releases the sections other than the decided section.

The communication terminal control section 102 also sets a part specified by the hold request (hold/disconnect request message) which is input from external device (for example, by the user) to hold status. For example, while voice communication information is being transmitted/received using the external handset 203, a setup message is further received from the base station (not illustrated) and both the former and latter bearers are the same, and if an instruction to hold the communication by the external handset 203 is input at this time, then the communication terminal control section 102 sets the external handset 203 to hold status. The communication terminal control section 102 also sets a part specified by the disconnect request (hold/disconnect request message) which is input from external device (for example, by the user) to disconnect status. For example, while the voice communication information is being transmitted/received using the voice communication operating section 103a, a setup message is further received from the base station (not illustrated), and the former and latter bearers are different, and if an instruction to disconnect the communication by the voice communication operating section 103a is input at this time, then the communication terminal control section 102 sets the voice communication operating section 103a to disconnect status. For both the case of setting to hold status and setting to disconnection status, the bearer of the current communication and the new incoming bearer may be the same or different.

The voice communication operating section 103a is comprised of an operation control means 104a which has control functions described below in the voice communication operating section 103a. The voice communication operating section 103a is a section which can handle voice communication information, and handles the information where the type of the each bearer is voice communication, out of the information which the communication terminal 10 transmits/receives. When the voice communication operating section 103a receives the incoming bearer information for specifying the bearer from the communication terminal control section 102, the voice communication operating section 103a outputs a call confirm request message for accepting the incoming call with the bearer (first call confirm request messages) if the bearer specified by the incoming bearer information is voice communication, and outputs a call confirm request message for accepting the incoming call with a voice communication bearer (second call confirm request messages) or outputs an incoming call reject request message for rejecting the incoming call if the bearer is a bearer other than voice communication. The voice communication operating section 103a includes a microphone and speaker as the input/output means, and regenerates voice communication received by the data transmission/reception section 101 by driving the speaker, encodes the voice communication which is input from the microphone, and outputs it to the data transmission/reception section 101 via the communication terminal control section 102.

The sound and video communication operating section 103b is comprised of an operation control means 104b which has control functions described below in the sound and video communication operating section 103b. The sound and video communication operating section 103b is a section which can handle the sound and video communication information or unrestricted digital communication information, and handles the sound and video communication information where the type of the bearer is sound and video communication or unrestricted digital communication information where the type of the bearer is non-restrictive, out of the information to be transmitted/received by the communication terminal 10. When the sound and video communication operating section 103b receives the incoming bearer information for specifying a bearer from the communication terminal control section 102, the sound and video communication operating section 103b outputs the call confirm request message for accepting the incoming call with the bearer (first call confirm request messages) if the bearer specified by the incoming bearer information is sound and video communication or unrestricted digital communication which the sound and video communication operating section 103b is supposed to respond to, outputs the call confirm request message for accepting a bearer with which response is made (second call confirm request messages) if the sound and video communication operating section 103b is supposed to response to with a bearer other than the bearer specified by the incoming bearer, or outputs the incoming call reject request message if the incoming call is rejected. The sound and video communication operating section 103b may be set so as to assign priority to the handling of the sound and video communication information, for example, and in this case, the call confirm request message for accepting the incoming call with a sound and video communication bearer (second call confirm request messages) is output if the incoming bearer information specifies a unrestricted digital communication bearer. The sound and video communication operating section 103b includes a display, camera, microphone and speaker as the input/output means, and regenerates the image and sound received by the data transmission/reception section 101 by driving the display and speaker, encodes the sound and video communication which are input from the camera and microphone, and outputs the data to the data transmission/reception section 101 via the communication terminal control section 102.

The unrestricted digital communication operating section 103c is comprised of an operation control means 104c which has control functions described below in the unrestricted digital communication operating section 103c. The unrestricted digital communication operating section 103c is a section which can handle unrestricted digital communication information or sound and video communication information, and handles information where the type of the bearer is unrestricted digital communication or sound and video communication of all the information that the communication terminal 10 transmits/receives. When the unrestricted digital communication operating section 103c receives the incoming bearer information for specifying a bearer from the communication terminal control section 102, the unrestricted digital communication operating section 103c outputs a call confirm request message for accepting the incoming call with the bearer (first call confirm request messages) if the bearer specified by the incoming bearer information is non-restrictive or sound and video communication, with which the unrestricted digital communication operation section 103c is supposed to respond to, outputs a call confirm request message for accepting the incoming call with a bearer with which response is made (second call confirm request messages) if the unrestricted digital communication operating section 103c is supposed to respond to with a bearer other than the bearer specified as the incoming bearer, or outputs an incoming call reject request message if the incoming call is rejected. The unrestricted digital communication operating section 103c may be set so as to assign priority to the handling of the unrestricted digital communication information, for example, and in this case, the call confirm request message for accepting the incoming call with a unrestricted digital communication bearer (second call confirm request messages) is output if the incoming bearer information specifies a sound and video communication bearer. When the unrestricted digital communication information includes moving pictures, the unrestricted digital communication operating section 103c operates the display, camera, microphone and speaker, which are included as the input/output means, regenerates the moving pictures, which the data transmission/reception section 101 received, by driving the display and speaker, encodes the moving pictures, which are input from the camera and microphone, and outputs the data to the data transmission/reception section 101 via the communication terminal control section 102.

Now a method for responding with a section according to the intention of the user when a call comes in, using the communication system 30 including the communication terminal 10, will be described with reference to FIG. 2. FIG. 2 is a sequence chart depicting the processing of each section of the communication system 30, which includes the communication terminal 10. In the method described with reference to FIG. 2, it is assumed that bearers of unrestricted digital communication are classified into unrestricted digital communication 1 and unrestricted digital communication 2 for handling, depending on the difference of communication quality.

When a call comes in to a communication terminal 10, a set up message is sent from the base station (not illustrated) to the communication terminal 10, and is received by the data transmission/reception section 101 of the communication terminal 10 The setup message includes the incoming bearer information which specifies the bearer of this communication, which is assumed to be unrestricted digital communication 1 in the present embodiment. And the data transmission/reception section 101 outputs the received setup message to the communication terminal control section 102 of the communication terminal 10 (S101).

The communication terminal control section 102 outputs the setup indication message which was input to the voice communication operating section 103a, sound and video communication operating section 103b, unrestricted digital communication operating section 103c, and unrestricted digital communication operating equipment 201 of the communication terminal 10 respectively. To make understanding easier, the sound and video communication operating equipment 202 and external handset 203 are omitted in the description of the present embodiment (S102). Each one of voice communication operating section 103a, sound and video communication operating section 103b, unrestricted digital communication operation section 103c, and unrestricted digital communication operating equipment 201, to which the communication terminal control section 102 outputs a setup indication message, judges whether the bearer specified by the incoming bearer information included in the setup indication message can be supported (S103-S106). Based on the result of judgment, each section outputs one of the call setting reception information for accepting the incoming call with the incoming bearer, call setting reception information for accepting the incoming call with a bearer other than the incoming bearer, and the incoming call reject request message for rejecting the incoming call to the communication terminal control section 102 respectively. In the case of the present embodiment, the unrestricted digital communication operating section 103c outputs the call confirm request message for accepting the incoming call with the incoming bearer (S107), the sound and video communication operating section 103b, which can support the bearer of unrestricted digital communication 1 but is set to prefer the bearer of sound and video communication, outputs the call confirm request message for accepting the incoming call with the bearer of sound and video communication (S108), the unrestricted digital communication operating equipment 201, which can support the bearer of unrestricted digital communication 2, outputs the call confirm request message for accepting the incoming call with the bearer of unrestricted digital communication 2 (S109), and the voice communication operating section 103 outputs the incoming call reject request message (S110), to the communication terminal control section 102 respectively.

In this way, each one of the voice communication operating section 103a, sound and video communication operating section 103b, unrestricted digital communication operating section 103c, and unrestricted digital communication operating equipment 201 of the communication terminal 10 outputs the call confirm request message for accepting the incoming call with the incoming bearer, the call confirm request message for accepting the incoming call with a bearer other than the incoming bearer, or the incoming call reject request message for rejecting the incoming call according to the bearer of the incoming call. In the present embodiment, operating sections and communication terminal communication terminal control section accept the incoming call with the bearer decided according to the priority which is predetermined for the case of a plurality of bearers which can be supported. Information on the plurality of bearers which can be supported, may be stored within the operating sections and the communication terminal communication terminal control section, so that an incoming bearer and the stored bearers are compared, and the bearer with which the incoming call is accepted, is decided.

When the communication terminal control section 102 receives the call confirm request message or the incoming call reject request message from each one of the voice communication operating section 103a, sound and video communication operating section 103b, and unrestricted digital communication operating section 103c of the operating section 103 and the unrestricted digital communication operating equipment 201 respectively, the communication terminal control section 102 decides the bearer with which communication is actually performed (S111).

The communication terminal control section 102 outputs information for notifying that the bearer is decided for unrestricted digital communication 1 to the data transmission/reception section 101. The data transmission/reception section 101 sends the call confirmed message (unrestricted digital communication 1) to the mobile communication network 50 via the base station (not illustrated) according to the input from the communication terminal control section 102 (S112). The mobile communication network 50 sends the radio bearer setting information to indicate that a radio channel whereby user data can be transmitted/received is assigned to the communication terminal 10 via the base station (not illustrated) (S113).

When the data transmission/reception section 101 of the communication terminal 10 receives the radio bearer setting information which is sent from the base station (not illustrated), the data transmission/reception section 101 outputs the information to the communication terminal control section 102. The communication terminal control section 102 outputs the notify indication message including information for specifying the decided bearer to the section which output the call confirm request message, out of the voice communication operating section 103a, sound and video communication operating section 103b, unrestricted digital communication operating section 103c, and unrestricted digital communication operating equipment 201, on the reception of the radio bearer setting information (S114).

Each one of the sound and video communication operating section 103b, unrestricted digital communication operating section 103c and unrestricted digital communication operating equipment 201, to which the communication terminal control section 102 output the notify indication message, judges whether response to the bearer specified by the notify indication message is enabled (S115-S117), and outputs the judgment result to the communication terminal control section 102. Specifically, if response to the bearer is enabled, the alerting request messages is output to the communication terminal control section 102, and if response to the bearer is disabled, the release request message is output to the communication terminal control section 102. In the present embodiment, it is assumed that both the sound and video communication operating section 103b and the unrestricted digital communication operating section 103c judge that response to the bearer of unrestricted digital communication 1 is enabled, and alerting request messages is output from both of these sections (S118, S119). It is also assumed that the unrestricted digital communication operating equipment 201 judges that response is disabled, and outputs the release request message (S121). Here the communication terminal control section 102 judges that the section can respond if the alerting request messages is received, and judges that the section cannot respond if the release request message is received. The communication terminal control section 102 releases the unrestricted digital communication operating equipment 201 which output the release request message, so as to decide not to operate the information in this data communication, and outputs the release confirmation information to the unrestricted digital communication operating equipment 201 (S122).

When the alerting request messages is output, the communication terminal control section 102 sends the alerting information to the mobile communication network 50 via the data transmission/reception section 101 (S120). The sound and video communication operating section 103b and unrestricted digital communication operating section 103c, which output the alerting request messages to the communication terminal control section 102, start calling the user respectively. In the case of the present embodiment, the user is supposed to select a response to this call using the sound and video communication operating section 103b (S123). With this response selection, the sound and video communication operating section 103b outputs the setup response for notifying that response is selected, to the communication terminal control section 102 (S124).

According to this output, the communication terminal control section 102 decides the section to operate the information to be transmitted/received to/from the mobile communication network 50, that is the section to communicate, to be the sound and video communication operating section 103b (S125). The communication terminal control section 102 transmits the connect message to the mobile communication network 50 via the data transmission/reception section 101 (S126). According to this decision, the communication terminal control section 102 rejects indication message from the unrestricted digital communication operating section 103c (S127). The mobile communication network 50 transmits connect acknowledge message for the transmission of response in S126 (S128). The setup complete indication message is output to the sound and video communication operating section 103b which was decided as the section to communicate (S129), and the user communicates using the sound and video communication operating section 103c (S130).

Now a method for responding with a section according to the user intention, with holding the section which is in the course of communication when the setup message is received while the user is communicating with the communication terminal 10, will be described with reference to FIG. 3. FIG. 3 is a sequence chart depicting processing at each section of the communication terminal 10.

It is assumed that the user is in the course of communication with the bearer of the unrestricted digital communication using the unrestricted digital communication operating section 103c of the communication terminal 10 (S131). When a call comes in to the communication terminal 10 at this time, the incoming call is sent from the base station (not illustrated) to the communication terminal 10, and is received by the data transmission/reception section 101 of the communication terminal 10. The setup message includes the incoming bearer information to specify the bearer of this communication, and in the present embodiment, it is assumed that unrestricted digital communication information is specified. The data transmission/reception section 101 outputs the received setup message to the communication terminal control section 102 of the communication terminal 10 (S132). Here descriptions are omitted for the sequence from the communication terminal control section 102, outputting the setup indication message to each section, to receiving the alerting request messages, that is the sequence from S133 to S146 in FIG. 3, since this sequence corresponds to the sequence from S102 to S119 in FIG. 2.

When the alerting request messages is output, the communication terminal control section 102 sends the alerting information to the mobile communication network 50 via the data transmission/reception section 101 (S147). The sound and video communication operating section 103*b* and unrestricted digital communication operating section 103*c*, which output the alerting request messages to the communication terminal control section 102, starts calling the user respectively.

In the present embodiment, it is assumed that when a user is called up from the sound and video communication operating section 103*b* and unrestricted digital communication operating section 103*c*, the user sets the unrestricted digital communication operating section 103*c*, which is in the course of communication, to hold status, and selects communication using the sound and video communication operating section 103*b*. Therefore the hold request is input to the unrestricted digital communication operating section 103*c* (S148), and the hold request is output to the communication terminal control section 102 (S149). The communication terminal control section 102 sends the hold message to the mobile communication network 50 via the data transmission/reception section 101 (S150), and hold acknowledge message for notifying that hold processing has completed is transmitted from the mobile communication network 50 (S151). The communication terminal control section 102 outputs the hold confirm message to the unrestricted digital communication operating section 103*c* (S152), and hold processing completes.

When the user selects to respond with the sound and video communication operating section 103*b* (S153), the sound and video communication operating section 103*b* outputs the setup response for notifying response is selected to the communication terminal control section 102 responding to this response selection (S154). According to this output, the communication terminal control section 102 decides that the sound and video communication operating section 103*b* as the section to operate information to be transmitted/received to/from the mobile communication network 50, that is the section to communicate (S155). The communication terminal control section 102 transmits the connect information to the mobile communication network 50 via the data transmission/reception section 101 (S156).

According to this decision, the communication terminal control section 102 rejects indication message from the unrestricted digital communication operating section 103*c* (S157). And responding to the transmission of the response in S156, the mobile communication network 50 transmits the connect acknowledge message (S158). The setup complete indication message is output to the sound and video communication operating section 103*b* which is decided as the section to communicate (S159), and the user communicates using the sound and video communication operating section 103*b* (S160).

Now the method for responding with the section according to the user intention, with disconnecting the section which is in the course of communication when the setup message is received while the user is communicating with the communication terminal 10, will be described with reference to FIG. 4. FIG. 4 is a sequence chart depicting processing at each section of the communication terminal 10.

It is assumed that the user is in the course of communication with the bearer of the unrestricted digital communication using the unrestricted digital communication operating section 103*c* of the communication terminal 10 (S161). When a call comes in to the communication terminal 10 at this time, the setup message is sent from the base station (not illustrated) to the communication terminal 10, and is received by the data transmission/reception section 101 of the communication terminal 10. The setup message includes the incoming bearer information to specify the bearer of this communication, and in the present embodiment, it is assumed that the sound and video communication information is specified. The data transmission/reception section 101 outputs the received setup message to the communication terminal control section 102 of the communication terminal 10 (S162). Here descriptions are omitted for the sequence from the communication terminal control section 102 outputting the setup indication message to each section, to receiving the alerting request messages, that is the sequence from S163 to S176 in FIG. 4, since this sequence corresponds to the sequence from S102 to S119 in FIG. 2 respectively.

When the alerting request information is output, the communication terminal control section 102 sends the alerting information to the mobile communication network 50 via the data transmission/reception section 101 (S177). The sound and video communication operating section 103*b* and unrestricted digital communication operating section 103*c*, which output the alerting request messages to the communication terminal control section 102, starts calling the user respectively.

In the present embodiment, it is assumed that when the user is called up from the sound and video communication operating section 103*b* and unrestricted digital communication operating section 103*c*, the user disconnects the unrestricted digital communication operating section 103*c*, which is in the course of communication, and selects communication using the sound and video communication operating section 103*b*. Therefore the disconnect request message is input to the unrestricted digital communication operating section 103*c* (S178), and the disconnect request message is output to the communication terminal control section 102 (S179). The communication terminal control section 102 sends the disconnect message to the mobile communication network 50 via the data transmission/reception section 101 (S180), and release message, for notifying that disconnect processing has completed, is transmitted from the mobile communication network 50 (S181). The communication terminal control section 102 outputs the release indication message to the unrestricted digital communication operating section 103*c* (5182). Then the unrestricted digital communication operating section 103*c* outputs the release response to the communication terminal control section 102 (S192), the communication terminal control section 102 outputs the release complete message to the mobile communication network 50 (S193), and disconnect processing completes.

When the user selects to respond with the sound and video communication operating section 103*b* (S183), the sound and video communication operating section 103*b* outputs the setup response for notifying that response is selected to the communication terminal control section 102 responding to this response selection (S184). According to this output, the communication terminal control section 102 decides that the sound and video communication operating section 103*b* is the section to operate information to be transmitted/received to/from the mobile communication network 50, that is the section to communicate (S185). The communication terminal control section 102 transmits the connect message to the mobile communication network 50 via the data transmission/reception section 101 (S186).

According to this decision, the communication terminal control section 102 rejects indication message from the unrestricted digital communication operating section 103c (S187). The radio bearer setting information, for indicating that a channel corresponding to the bearer of sound and video communication is assigned, is sent from the mobile communication network 50 to the communication terminal 10 via the base station (not illustrated) (S188). Responding to the transmission of the response S186, the connect acknowledge message is transmitted from the mobile communication network 50 (S189). The setup complete indication message is output to the sound and video communication operating section 103b as a section to communicate (S190), and the user communicates using the sound and video communication operating section 103b (S191).

Next the functions and effects of the present embodiment will be described. The communication terminal control section 102 outputs the decided bearer information to the operating equipment (operating section) which output the call confirm request message (first call confirm request messages or second call confirm request messages), so even an operating equipment (operating section) which output the call confirm request message, that includes the second call confirm request messages according to the output of the incoming bearer information for example, can, have the possibility to be decided as a section for operating the information, and the flexibility in selecting operating equipments (operating sections) improves.

Also the communication terminal control section 102 processes such that the section currently in communication and selected by the user is set to hold status, so when an incoming call with a bearer of unrestricted digital communication is received while communicating with a bearer of unrestricted digital communication using the unrestricted digital communication operating section 103c, and when the user wants to respond using the sound and video communication operating section 103b and not the unrestricted digital communication operating section 103c which is currently in the course of communication, for example, the user can set the unrestricted digital communication operating section 103c currently in communication, and decide that the sound and video communication operating section 103b as the section for operating the information, so as to respond to the incoming call.

Also the communication terminal control section 102 processes such that the section, which is currently in the course of communication and is selected by the user, is set to disconnect status, so in the case of when an incoming call with a bearer of sound and video communication is received while communicating with a bearer of unrestricted digital communication using the unrestricted digital communication operating section 103c, and when the user wants to respond using the sound and video communication operating section 103b and not the unrestricted digital communication operating section 103c which is currently in the course of communication, for example, the user can disconnect the unrestricted digital communication operating section 103c currently in communication, and decide that the sound and video communication operating section 103b as the section for operating information, so as to respond to the incoming call.

In the present embodiment, unrestricted digital communication, sound and video communication, and voice communication were used as examples of a bearer, but a bearer is specified by a combination of information transfer capabilities, communication quality, coding system and communication speed and other factors, so for example, the unrestricted digital communication maybe further classified into unrestricted digital communication 1 and unrestricted digital communication 2 for handling. The effects of the present embodiment described above becomes even greater as each operating section and each interface section supports more bearers.

According to the present invention, the communication terminal control means outputs the decided bearer information to the operating equipment which has output the first call confirm request messages or second call confirm request messages, so even an operating equipment which has output the second call confirm request messages where the bearer is different from the decided bearer according to the output of the incoming bearer information, for example, can have the possibility to be decided as the section for operating information, and the flexibility in selecting operating equipments is improved. When a call comes in during communication, information on judging whether the operating equipment continues the incoming call processing can be provided, and each operating equipment can have the possibility to be decided as a section for operating the information, regardless the call acceptance information to be output by each operating equipment or the communication status of each operating equipment, and the flexibility in selecting operating equipments is improved. Therefore a communication terminal, operating equipment, communication system, and communication control method, which can improve the flexibility of selecting operating equipments when the operating equipment for operating information to be transmitted/received to/from a network is decided, can be provided, which is an object of the present invention.

What is claimed is:

1. A communication terminal, comprising:
   an interface configured to exchange information with a network;
   a controller configured to output, to each of a plurality of operating equipment, incoming bearer information for specifying a bearer of an incoming call included in a setup message received at said interface from said network;
   the controller configured to receive, from each of the plurality of operating equipment to which the incoming bearer information was output, one of a first call confirm request message for accepting an incoming call with said incoming bearer, a second call confirm request message for accepting an incoming call with a bearer other than said incoming bearer or incoming call reject request message for rejecting said incoming call, which are output by each of said plurality of operating equipment according to said incoming bearer information;
   the controller configured to decide a bearer for communicating with said network based on said one of said first call confirm request message, said second call confirm request message and said incoming call reject request received from each of said plurality of operating equipment; and
   the controller configured to output the decided bearer information for specifying said decided bearer to an operating equipment that output said first call confirm request message or said second call confirm request message.

2. The communication terminal of claim 1, wherein:
   the controller is configured to decide an operating equipment corresponding to a selection signal from an external device as an operating equipment for operating information to be transmitted/received to/from said network out of the operating equipment that output response enable information for notifying that the response to said decided bearer is enabled, and releases the operating equipments other than said decided operating equipment.

3. A communication system, comprising:

a communication terminal, comprising
- an interface configured to transmit or receive information to or from a network;
- a controller configured to decide an operating equipment for operating the information to be transmitted or received to or from said network out of a plurality of operating equipment which can operate information to be transmitted or received via said interface; and
- said controller configured to output, to each of the plurality of operating equipment, incoming bearer information for specifying a bearer of said incoming call included in the setup message received at said interface from said network; and each one of said plurality of operating equipment are configured to output one of a first call confirm request message for accepting the incoming call with said incoming bearer, a second call confirm request message for accepting the incoming call with a bearer other than said incoming bearer, and an incoming call reject request message for rejecting said incoming call to said controller;

the controller configured to decide a bearer for communicating with said network according to said output received from each of said plurality of operating equipment, and configured to output decided bearer information for specifying said decided bearer to the operating equipment which has output said first call confirm request message or said second call confirm request message, wherein said operating equipment corresponding to said decided bearer outputs, to the communication terminal, response enable information indicating that response to said decided bearer is enabled; and wherein said controller decides an operating equipment corresponding to a selection signal from an external device, out of the operating equipment which have output said response enable information, as the operating equipment which operates information to be transmitted or received to or from said network and releases the operating equipments other than said decided operating equipment.

4. A communication terminal, comprising:

an interface configured to transmit or receive information to or from a network;

a controller configured to output, to each of a plurality of operating equipment, incoming bearer information for specifying a bearer of an incoming call included in a setup message received from said network;

the controller configured to receive, from each of the plurality of operating equipment to which the incoming bearer information was output, one of a a first call confirm request message for accepting an incoming call with said incoming bearer, a second call confirm request message for accepting an incoming call with a bearer other than said incoming bearer, or incoming call reject request message for rejecting said incoming call, which are output by each of said plurality of operating equipment according to said output incoming bearer information;

the controller configured to decide a bearer for communicating with said network based on said one of said first call confirm request message, said second call confirm request message and said incoming call reject request received from each of said plurality of operating equipment;

the controller configured to output the decided bearer information for specifying said decided bearer to the operating equipment which has output said first call confirm request message or said second call confirm request message; and the controller configured to perform processing so that the operating equipment which is in the course of communication and is specified by a hold/disconnect request message received from an external device becomes hold status or disconnect status, and decides an operating equipment corresponding to a selection signal from said external device, out of the operating equipments which have output response enable information for notifying that response to said decided bearer is enabled, as the operating equipment for operating information to be transmitted or received to or from said network, and releases the operating equipments other than said decided operating equipment.

5. A communication control method, comprising:

specifying and outputting, at a controller of a communication terminal, a bearer of an incoming call included in a setup message received from a network to each one of a plurality of operating equipment configured to operate information to be transmitted or received via said communication terminal;

receiving one of a first call confirm request message for accepting an incoming call with said incoming bearer, a second call confirm request message for accepting an incoming call with a bearer other than said incoming bearer, or an incoming call reject request message for rejecting said incoming call, from each of said plurality of operating equipments according to the output of said incoming bearer information;

determining a bearer for communicating with said network based on said one of said first call confirm request message, said second call confirm request message and said incoming call reject request received from each of said plurality of operating equipment;

outputting, from said communication terminal, the decided bearer information for specifying said decided bearer to the operating equipment that output said first call confirm request message or said second call confirm request message;

determining, out of the operating equipments which have output response enable information for notifying that response to said decided bearer is enabled, an operating equipment corresponding to a selection signal from an external device as the operating equipment for operating information to be transmitted or received to or from said network according to the output of said decided bearer information; and releasing the operating equipment other than the operating equipment decided in said determining step which have output the response enable information for notifying that response to the decided bearer is enabled.

6. A communication terminal, comprising:

an interface configured to receive an incoming call request from a network, said call request including call setup information indicating that the received call is one of an unrestricted digital communication, a multimedia communication and a voice communication;

a controller configured to output the call setup information to each of a plurality of operating equipment connected to the communication terminal;

the controller configured to receive at least one of a first call confirm request message for accepting the incoming call request and an incoming call reject request message for rejecting said incoming call, output by each of said plurality of operating equipment; and the controller configured to select one of said plurality of operating equipment as the operating equipment that will process the incoming call request, and outputting said selection result to the selected operating equipment based on said output received from each of said plurality of operating equipment.

* * * * *